(12) United States Patent
Staehlin

(10) Patent No.: US 10,300,987 B2
(45) Date of Patent: May 28, 2019

(54) LEVER DRIVEN BICYCLE WITH SYNCHRONOUS DRIVE RATIO CONTROL

(71) Applicant: John H Staehlin, Westminster, MD (US)

(72) Inventor: John H Staehlin, Westminster, MD (US)

( * ) Notice: Subject to any disclaimer, the term of this patent is extended or adjusted under 35 U.S.C. 154(b) by 184 days.

(21) Appl. No.: 15/365,168

(22) Filed: Nov. 30, 2016

(65) Prior Publication Data

US 2018/0148130 A1 May 31, 2018

(51) Int. Cl.
*B62M 13/02* (2006.01)
*B62M 1/30* (2013.01)
*B62M 1/28* (2013.01)
*B62M 25/00* (2006.01)
*B62K 3/10* (2006.01)

(52) U.S. Cl.
CPC .............. *B62M 13/02* (2013.01); *B62K 3/10* (2013.01); *B62M 1/28* (2013.01); *B62M 1/30* (2013.01); *B62M 25/00* (2013.01)

(58) Field of Classification Search
CPC .......... B62M 13/02; B62M 3/06; B62M 1/30; B62M 3/08
USPC .................... 280/238, 253, 259, 260, 261
See application file for complete search history.

(56) References Cited

U.S. PATENT DOCUMENTS

| | | | | | |
|---|---|---|---|---|---|
| 3,039,790 | A | * | 6/1962 | Trott | B62M 1/28 280/251 |
| 3,834,733 | A | * | 9/1974 | Harris | B62M 1/28 280/251 |
| 3,984,129 | A | * | 10/1976 | Hege | B62M 1/28 280/251 |
| 3,998,469 | A | * | 12/1976 | Ruys | B62M 1/32 280/254 |
| 4,421,334 | A | | 12/1983 | Efros | |
| 4,456,276 | A | * | 6/1984 | Bortolin | B62M 1/32 280/257 |
| 5,254,044 | A | * | 10/1993 | Anderson | B62M 9/122 474/103 |
| 5,988,662 | A | * | 11/1999 | Staehlin | B62M 1/28 280/251 |
| 2002/0074767 | A1 | * | 6/2002 | Wielkopolski | B62M 1/24 280/259 |

* cited by examiner

*Primary Examiner* — Jacob D Knutson
(74) *Attorney, Agent, or Firm* — Finnegan, Henderson, Farabow, Garrett & Dunner LLP

(57) ABSTRACT

A lever driven bicycle with synchronous drive ratio control is disclosed. The lever driven bicycle may include a pair of drive levers pivotable around an axis. The lever driven bicycle may also include a force applicator connected to each drive lever, each force applicator configured to receive an application of a force to rotate a drive wheel. The lever driven bicycle may further include a control mechanism connected to the pair of drive levers, the control mechanism configured to synchronously adjust a drive ratio of each drive lever.

12 Claims, 17 Drawing Sheets

LEVER DRIVEN BICYCLE WITH SYNCHRONOUS DRIVE RATIO CONTROL

TECHNICAL FIELD

The present disclosure relates to bicycles, such as bicycles especially designed for physically disabled and frail elderly riders and more particularly, to lever driven bicycles having manual or motor driven synchronized shifter mechanism for controlling the drive ratio between the lever and the drive wheel. In a motor driven mode, the bicycle has a processor executing an automatic shifting algorithm which receives input of sensed lever pedal pressure and adjusts the drive ratio to maintain a near constant lever pedal pressure regardless of changes in the terrain being traversed.

BACKGROUND

Typical bicycles are driven by crank systems, which utilize unidirectional rotational movement to propel the bicycle drive wheel. Such directional rotational movement results in a varying torque induced by a primarily downward foot pressure from near zero to a maximum and back again to zero for each half revolution. This motion is necessitated by the conventional crank design, which includes a continuous chain that is received around a crank and a sprocket. Conventional bicycles also include shifting mechanisms, which adjust the drive ratio between the crank and the sprocket by controllably locating the chain about selected sprockets of different diameters. These conventional crank driven bicycles, with their varying torque, are difficult or impossible to ride for those with certain physical disabilities such as a person with only one leg, a person having one leg weaker than the other, a person having limited range of motion, etc.

One possible solution to assist the physically disabled in riding bicycles includes the lever driven bicycle, which has been designed to replace the conventional drive with oscillating displacement of the lever. Such lever driven bicycles utilize a dual lever arrangement in which each lever oscillates individually as propelled by each leg of the rider. One example of a lever driven bicycle is disclosed in U.S. Pat. No. 3,039,790 to Trott. Lever driven bicycles have also been designed with shifting mechanisms which allow for manual control of the drive ratio between the lever and the drive wheel. For example, U.S. Pat. No. 3,834,733 to Harris and U.S. Pat. No. 4,421,334 to Efros both disclose lever driven bicycles having shifter arrangements which allow the rider to manually adjust the drive ratio between the lever and the drive wheel. U.S. Pat. No. 5,988,662 to Staehlin also describes a lever driven bicycle configured for manual adjustment of a shifting mechanism.

The oscillating motion of a lever driven bicycle may be preferable to a physically disabled rider because of the substantially constant torque and less cumbersome linear movement required to propel the bicycle. However, lever driven bicycles to date still do not produce the efficient drive and ease of power application required by many people with physical disabilities. Further, previous lever driven bicycles may require that adjustments to a drive ratio of each lever be made separately and independently. The separate adjustment configuration, however, may render it difficult for a rider to balance the drive ratios of the levers without extensively monitoring the settings. Further, previous lever driven bicycles lack means to insure that drive ratio adjustments are made while the drive wheel is rotating, which has been found to be safer and more efficient than making adjustments while the drive wheel is stationary. In light of the foregoing there is a need for an improved lever driven bicycle that allows for easier adjustment of the drive ratios of the levers, as well as for addressing the needs of the physically disabled and the frail elderly.

The present disclosure is directed to overcoming one or more of the problems set forth above and/or other problems of the prior art.

SUMMARY

In accordance with disclosed embodiments, a lever driven bicycle may include a pair of drive levers pivotable around an axis, and a force applicator connected to each drive lever and configured to receive an application of a force to rotate a drive wheel. The lever driven bicycle may also include a control mechanism connected to the pair of drive levers, the control mechanism configured to synchronously adjust a drive ratio of each drive lever.

Consistent with the disclosed embodiments, the control mechanism of the lever driven bicycle may include a strain sensor and its associated electronics, a wheel rotation sensor and its associated electronics, a shifting mechanism located adjacent each drive lever for selectively changing a drive ratio between the drive lever and the drive wheel, and a drive ratio control unit for synchronously adjusting the drive lever shifting mechanism. Each force converter may be driven by a lead screw rotatably attached to an associated drive lever such that the lead screw of each drive lever may be synchronously driven by the drive ratio control unit, which may be attached to a frame assembly of the bicycle in close proximity to the rear wheel assembly of the bicycle.

DETAILED DESCRIPTION

Reference will now be made in detail to the present embodiments, examples of which are illustrated in the accompanying drawings. Whenever possible, the same reference numbers will be used throughout the drawings to refer to the same or like parts.

Figure 1:
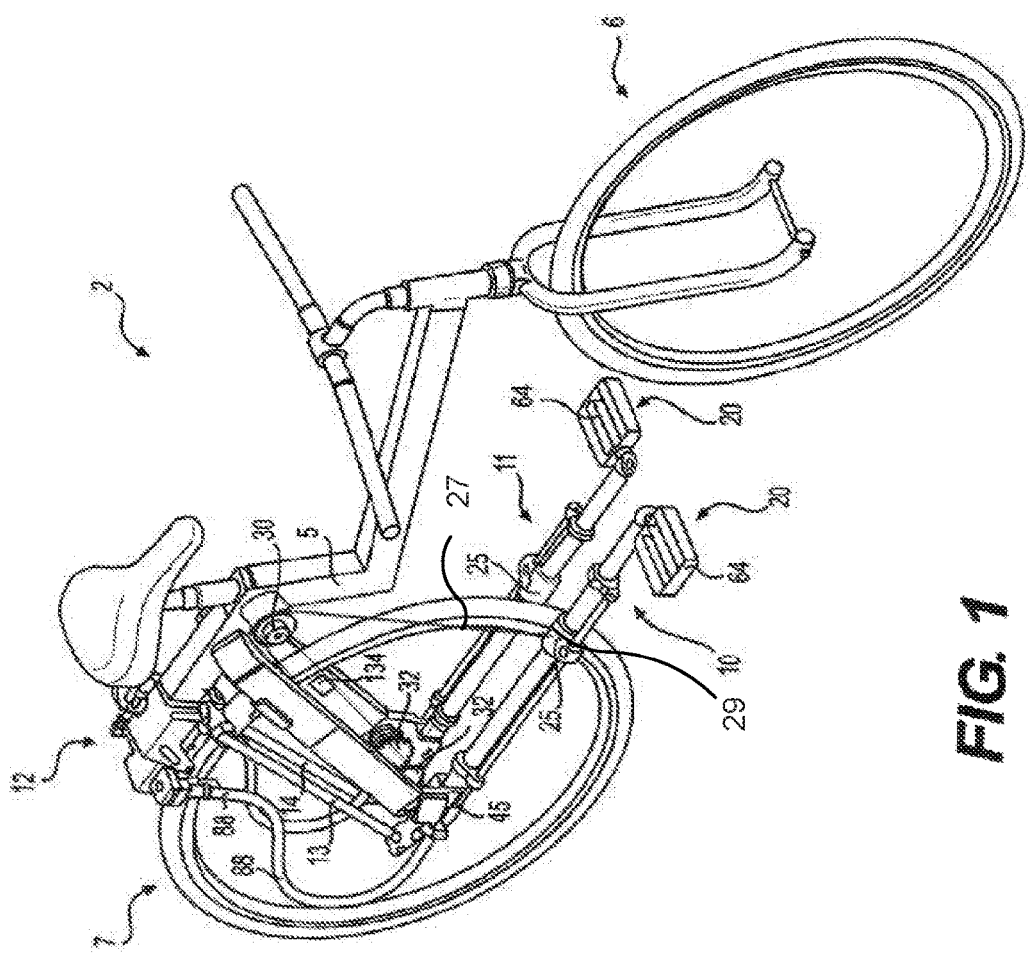
FIG. 1 is an illustration of an exemplary disclosed lever driven bicycle.
Figure 2:
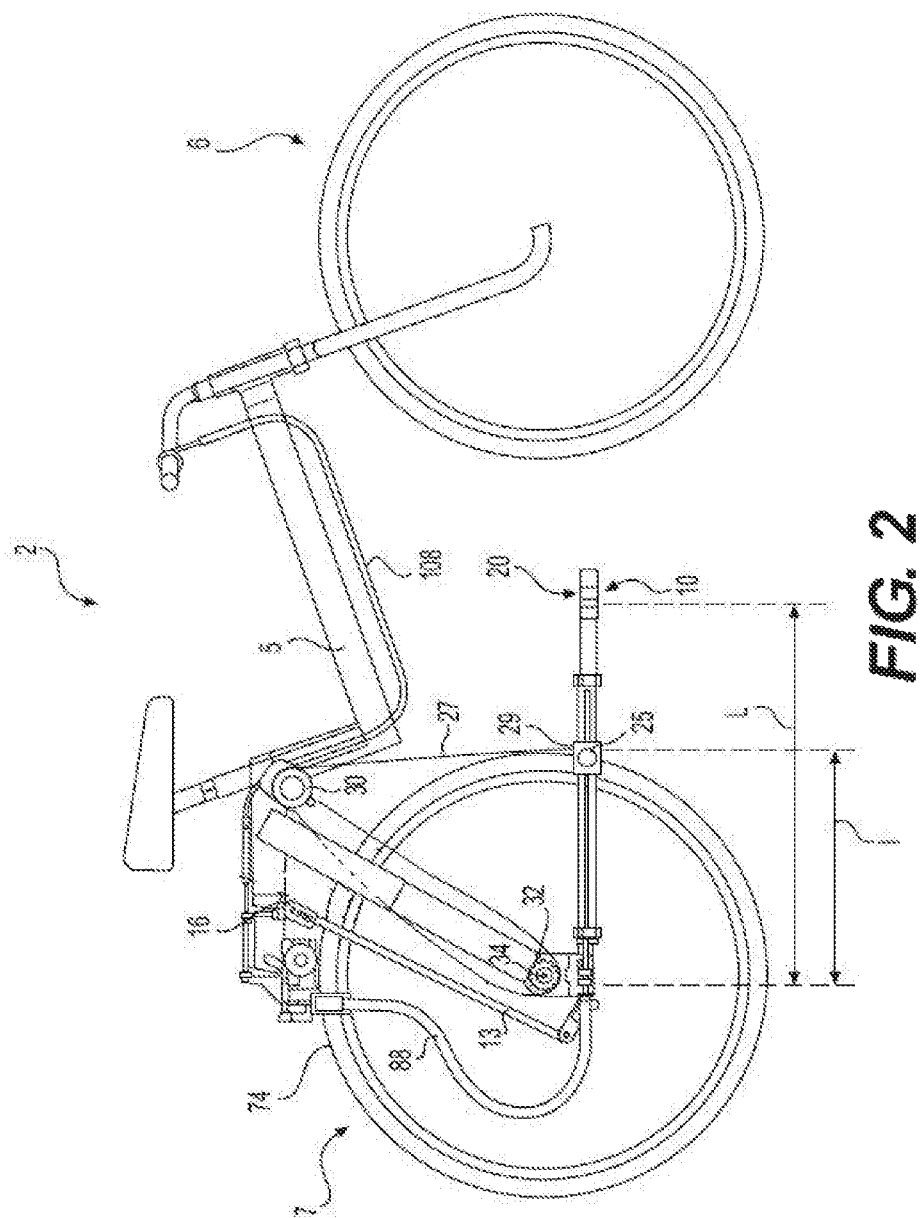
FIG. 2 is a side view illustration of the lever driven bicycle of FIG. 1.

FIGS. 1-2 depict an exemplary lever driven bicycle 2. The bicycle 2 may include a frame assembly 5, a front wheel assembly 6, a rear wheel assembly 7, two drive levers 10 and 11, and a control mechanism 12. In some embodiments, with the exception of drive levers 10 and 11 and control mechanism 12, and those elements associated therewith, bicycle 2 may include one or more elements normally found on conventional crank driven bicycles such as, for example, brake systems, cables, handlebars, etc. Bicycle 2, however, may be driven by articulated oscillation of the two drive levers 10 and 11. In addition, drive ratios of the drive levers 10 and 11 may be controlled by control mechanism 12.

Figure 17:
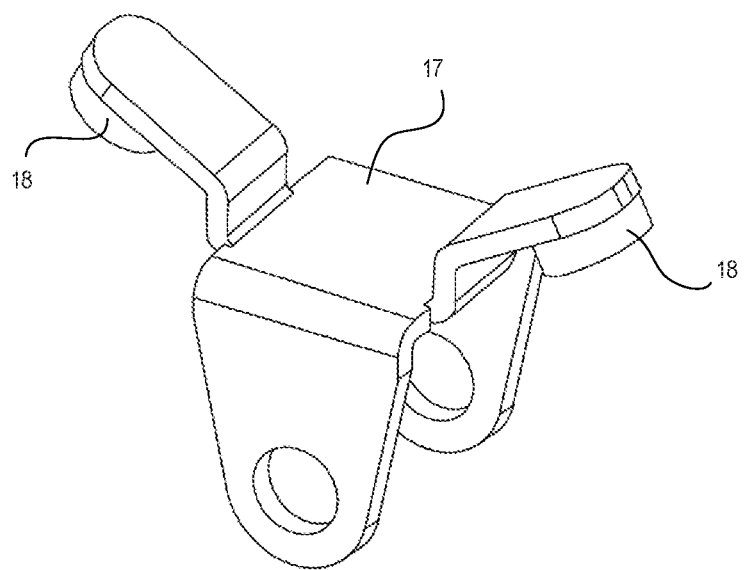
FIG. 17 shows an exemplary cross link bracket that may be used in the disclosed lever driven bicycle.

Drive levers 10 and 11 may be pivotally mounted to frame assembly 5 and further connected to bicycle 2 through push rods 13 and 14. Push rods 13 and 14 may be pivotally connected to drive levers 10 and 11 at one end and pivotally connected at the other end to a cross link 16. Cross link 16 may be pivotally connected to a cross link bracket 17 fixed to frame assembly 5 above rear wheel assembly 7. Push rods 13 and 14 and cross link may be arranged such that pivoting motion of one drive lever 10, 11 causes an opposite pivoting motion of the other drive lever 10, 11. For example, pivoting motion of drive lever 10 may pull down on push rod 13, causing clockwise rotation of cross link 16. Such rotation of cross link 16 may pull up on push rod 14, causing drive lever 11 to pivot in an opposite direction than that of drive lever 10. This arrangement may provide for the articulated counter rotation of one driver lever versus the other during a pedaling operation of bicycle 2. As depicted in FIG. 17, in some embodiments, the cross link bracket 17 may include bumper stops 18 configured to limit the range of motion (e.g., overall angular travel) of drive levers 10, 11.

In an exemplary embodiment, drive levers 10 and 11 may each include a force applicator 20 and a force converter 25 for transferring power to rear wheel assembly 7. For example, a rider may impart force to force applicator 20, which may cause movement of force converter 25, which may produce rotary motion of rear wheel assembly 7. For example, rotation of rear wheel assembly 7 may be created by articulated motion of drive levers 10 and 11 through alternating application of foot pressure by a rider on force applicators 20. For instance, the application of foot pressure to a force applicator 20 may apply a corresponding force to force converter 25 (e.g., when a rider presses down on force applicator 20, force converter 25 may also move downward due to a pivoting motion of the corresponding drive lever 10, 11). In an exemplary embodiment, force converter 25 may convert this translational motion into rotation of rear wheel assembly 7 through a chain 27. While chain 27 and associated components are described herein, it should be understood that other embodiments of bicycle 2 may include different mechanisms for translating motion of drive levers 10, 11 into rotation of rear wheel assembly 7.

Figure 16:
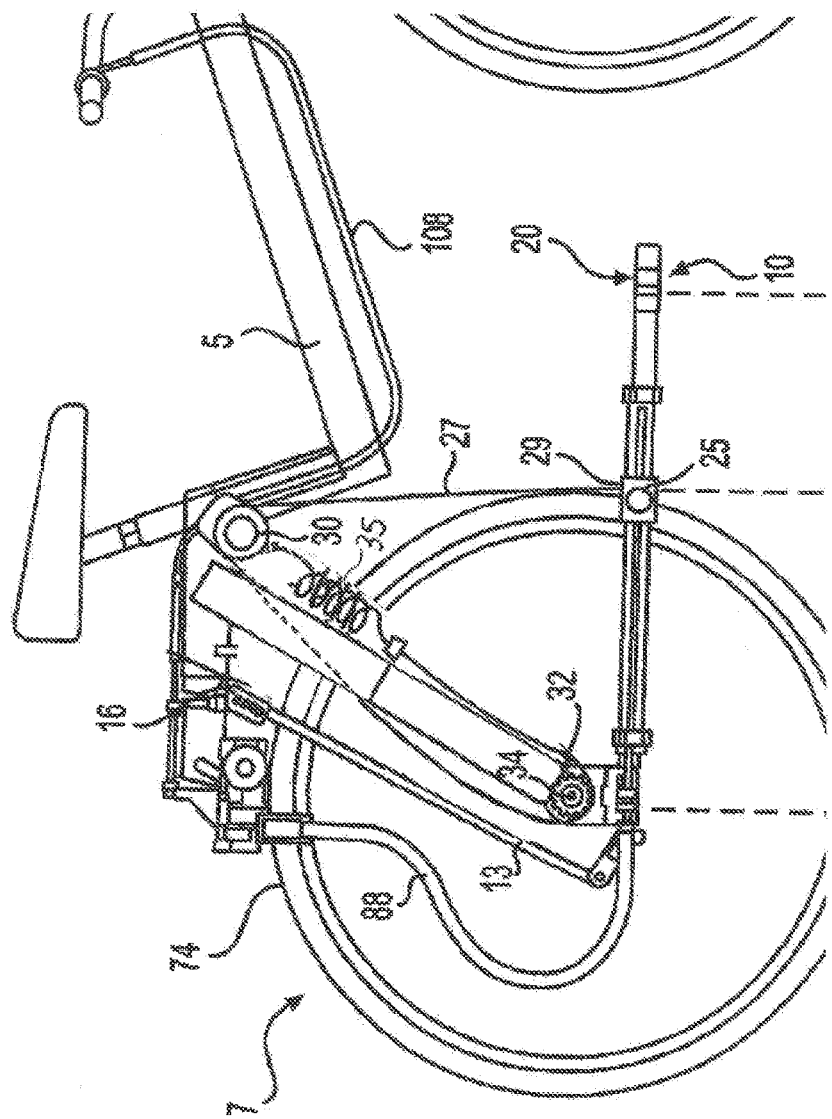
FIG. 16 shows a partial side view of another exemplary lever driven bicycle.

Chain 27 may be connected to force converter 25 at a chain attachment location 29. Chain 27 may extend upward from chain attachment location 29 and over a sprocket 30 attached to an upper portion of frame assembly 5. Chain 27 may extend from around an upper portion of the sprocket 30 (counter-clock wise around the sprocket 30) back down and around a lower portion of corresponding sprocket 32 (e.g., a one-way clutch sprocket) in an counter-clock wise direction. Sprocket 32 is connected to an axle 34 of rear wheel assembly 7. Chain 27 may wrap partially around a lower portion of sprocket 32, goes upward and terminates at an axis of lower portion of sprocket 32 (e.g., an axis around which sprocket 32 rotates). In some embodiments, chain 27 may be a metal chain. In some embodiments, chain 27 may be made of an elastic material that can supply a tension force sufficient to keep chain 27 in contact with sprockets 30, 32 and to overcome a frictional rewind torque that may be applied by sprocket 32. It should be understood that the above description of chain 27 and sprockets 30, 32 applies to one drive lever 10, 11, and that a separate chain 27 and sprockets 30, 32 may be similarly arranged with respect to the other of drive levers 10, 11. In some embodiments, as shown in FIG. 16 (discussed in detail below), the bicycle 2 includes a spring 35 at an end of chain 27 to provide the tension force.

Through the exemplary arrangement of chain 27 and sprockets 30, 32, a force (e.g., downward force caused by application of foot pressure) imparted on force applicator 20 of drive lever 10 may cause rotation of rear wheel assembly 7 by causing force converter 25 to pull down on chain 27. For example, this movement of chain 27 may cause rotation of sprocket 32, causing rotation of axle 34, and, thus, rotation of rear wheel assembly 7. While downward movement of force converter 25 of drive lever 10 may cause upward movement of force converter 25 of drive lever 11 (e.g., via rotation of cross link 16), tension of the chain 27 associated with drive lever 11 may be maintained by either the chain itself or the corresponding spring 35 (shown in FIG. 16). Subsequent application of a downward force to the force converter 25 of drive lever 11 (and/or upward force applied to drive lever 10) may pull down on the chain 27 associated with drive lever 11, causing rotation of the sprocket 32 associated with drive lever 11, and further providing an angular force to the rear wheel assembly 7. Alternating application of force to drive levers 10, 11 may cause continuous rotation of rear wheel assembly 7 and, thus, propel bicycle 2.

An amount of effort required by a rider to propel bicycle 2 using drive levers 10, 11 and the associated components, as well as corresponding power output to rear wheel assembly 7, may depend at least on a drive ratio of each of the drive levers 10, 11. In an exemplary embodiment, a drive ratio of a lever driven bicycle may include a comparison between a fixed length "L" from a lever pivot axis to a pedal axis, and a variable length "l" from a force converter to the lever pivot axis. In an exemplary embodiment of bicycle 2, length "l" may be varied by adjusting a position of force converter 25 on corresponding drive levers 10, 11.

Previous lever driven bicycles required that adjustments to a drive ratio of each drive lever 10, 11 be made separately and independently. Bicycle 2 with control mechanism 12, on the other hand, allows for synchronous adjustment of the drive ratios of drive levers 10, 11, thus helping alleviate problems associated with adjusting and/or attempting to adjust the drive ratios associated with bicycle 2, as described in more detail below.

Figure 3:
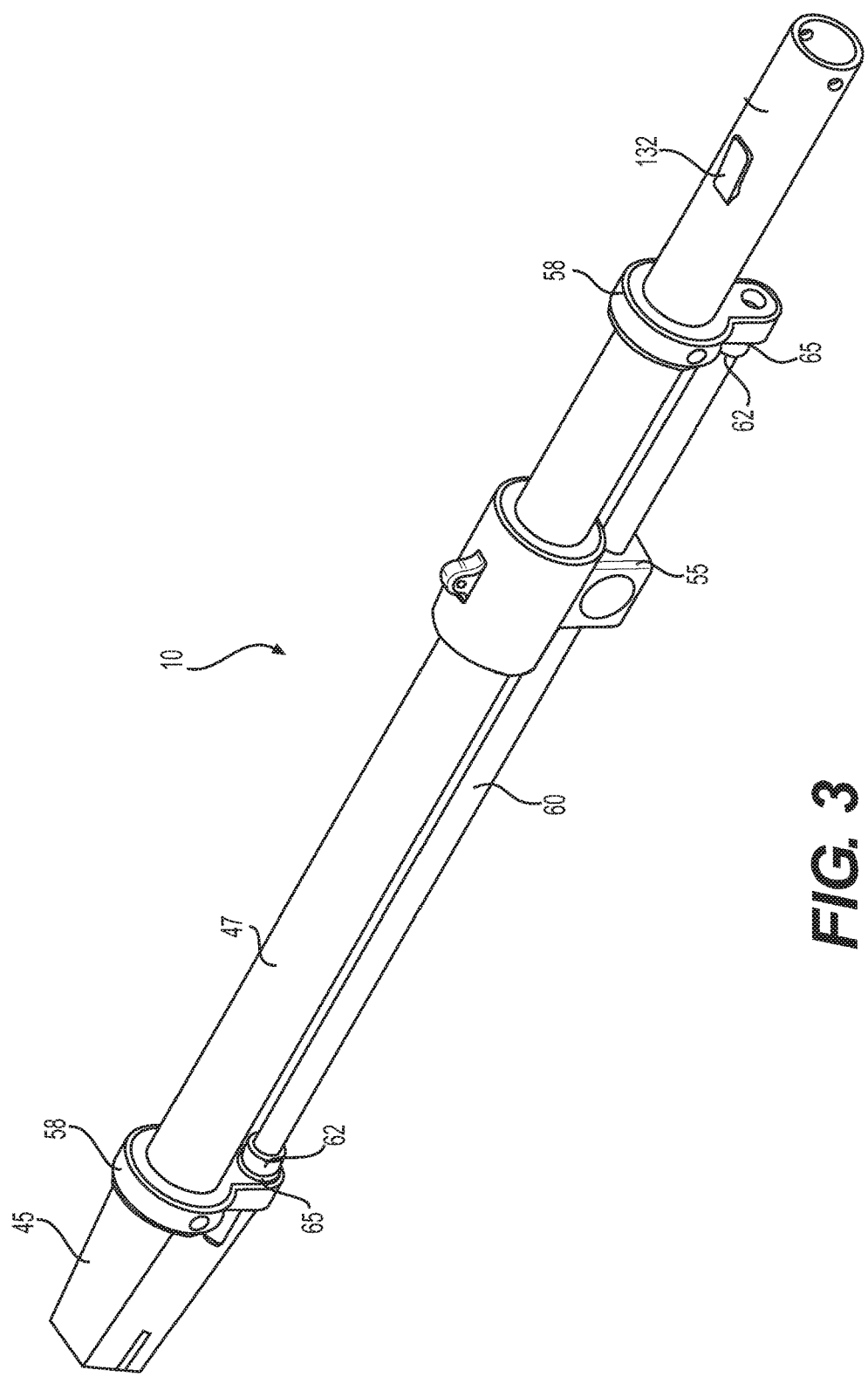
FIG. 3 is an illustration of an exemplary lever device that may be used in the disclosed lever driven bicycle.

FIG. 3 depicts an exemplary embodiment of drive lever 10. While drive lever 10 is depicted and described, it should be understood that the depiction and description may equally apply to drive lever 11. Drive lever 10 may include at least one of a pivot shaft unit 45, a tubular body 47, a threaded pedal adapter 49, a slider block 55, a pair of support housings 58, a lead screw 60, a pair of lead screw thrust bushings 62, a pedal assembly 64 (shown only in FIGS. 1-2), and one or more flanged bushings 65 (e.g., Oilite® bronze flanged bushings).

Figure 4:
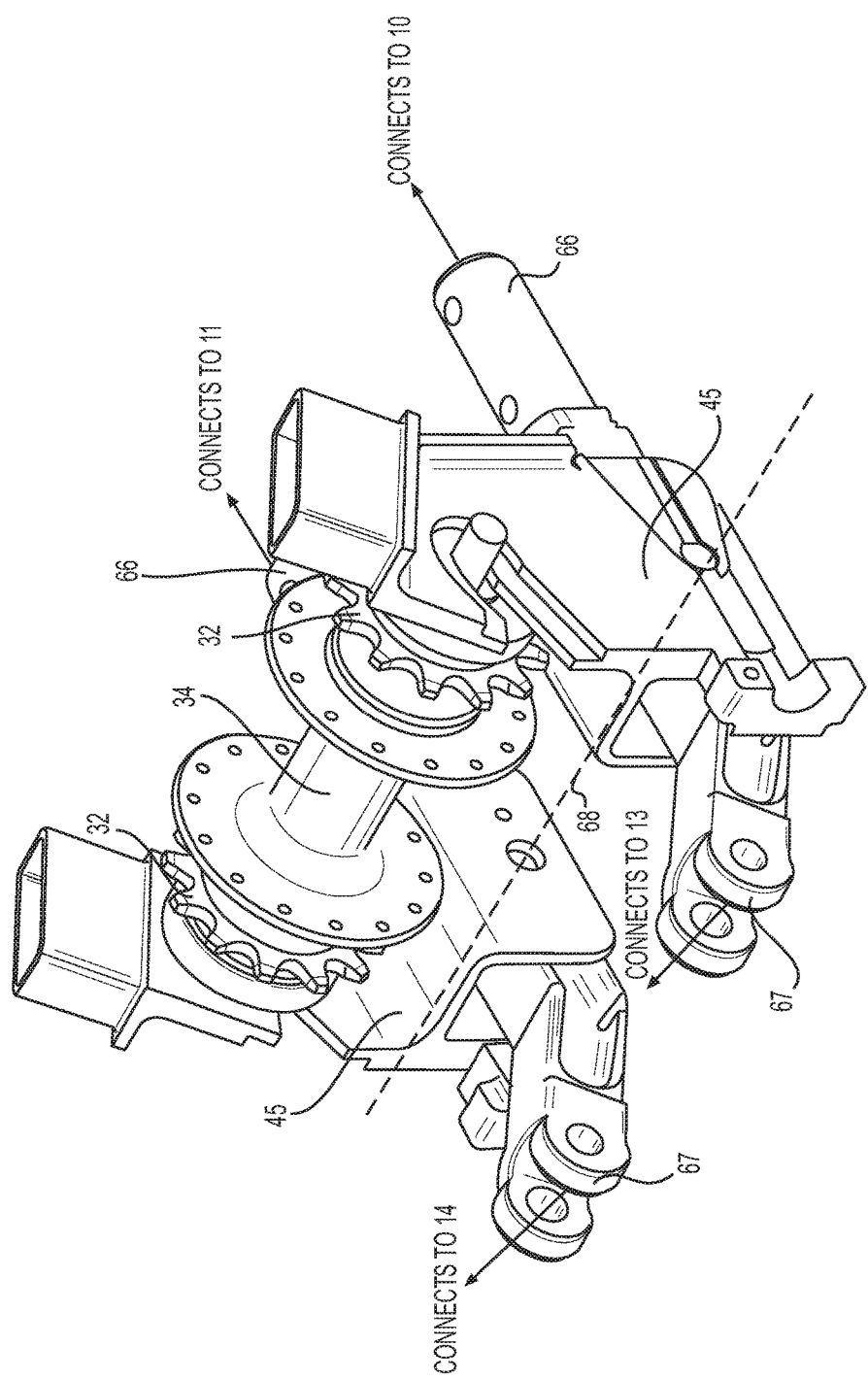
FIG. 4 is an illustration of an exemplary gear device that may be used in the disclosed lever driven bicycle.

FIG. 4 further depicts pivot shaft unit 45. At one end, pivot shaft unit 45 may include a connector 66 configured to connect pivot shaft unit 45 to tubular body 47. At an opposite end, pivot shaft unit 45 may include a lever articulation mechanism 67 configured to be connected to push rod 13. Pivot shaft unit 45 may be pivotally mounted to frame assembly 5 (e.g., below axle 34) such that pivot shaft unit 45 is configured to pivot about a lever pivot axis 68.

Returning to FIG. 3, slider block 55 may be threaded onto lead screw 60. Slider block 55 may be fixedly attached to force converter 25. In some embodiments, slider block 55 and force converter 25 may be the same component (e.g., include a unitary structure). In other embodiments, slider block 55 and force converter 25 may be separate components that are attached to each other. Thrust bushings 62 may be positioned at the ends of the lead screw 60, with flanged bushings 65 also being placed on lead screw 60 with respective flanges thereof contacting a corresponding thrust bushing 62.

A support housing 58 may be inserted on each of the flanged bearings 65, a first bore thereof being aligned axially with a bore of slider block 55. In order to fixedly attach lead screw 60 in position parallel to tubular body 47, support housings 58 may be fixed near opposing ends of tubular body 47. For example, support housings 58 may include second bores into which tubular body 47 is placed and pinned. Pivot shaft unit 45 may be attached to one end of tubular body 47 and pedal adapter 49 may be attached to the other end of tubular body 47 and pedal assembly 64 connected to pedal adapter 49.

The resulting drive lever 10 may include tubular body 47 pivotally attached to frame assembly 5 and fixedly attached in parallel to lead screw 60. Slider block 55 may be threaded onto lead screw 60 such that rotation of lead screw 60 may cause slider block 55 to slide along tubular body 47. Movement of slider block 55 may thus cause a change in the location of force converter 25 with respect to lever pivot axis 68 and pedal assembly 64, thus causing a change in drive ratio (e.g., by modifying the variable length "l"). Accordingly, a drive ratio of drive lever 10 may be adjusted through rotation of lead screw 60.

Referring back to FIGS. 1-2 control mechanism 12 may include a drive ratio control mechanism 70, which may be attached to frame assembly 5 by a support bracket 72. For example, support bracket 72 may be securely connected (through any suitable connection means) to frame assembly 5 in close proximity to a surface 74 of a tire of rear wheel assembly 7. Drive ratio control mechanism 70 may include drive gears 75, 76 rotatably connected to a support housing 77. At least one of drive gears 75, 76 may be configured to be placed into contact with surface 74, such that the drive gear 75, 76 in contact with surface 74 is forced to rotate due to rotation of rear wheel assembly 7. In some embodiments, a dual-ended, self-centering spring means (not shown), or other mechanism with a similar functionality, may be configured to hold drive ratio control mechanism 70 in a neutral position (e.g., with neither drive gear 75 or 76 touching surface 74).

Figure 5:
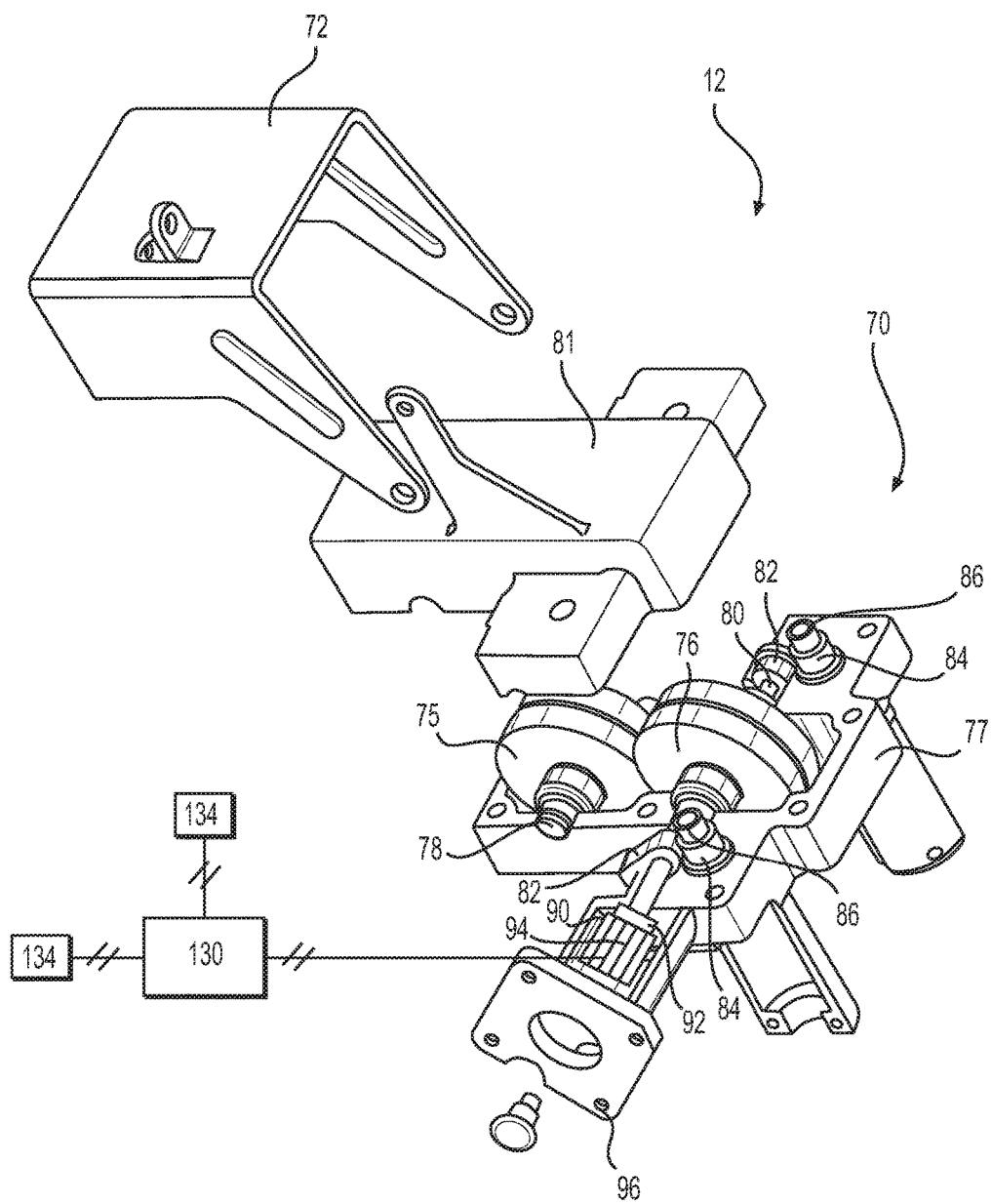
FIG. 5 is an illustration of an exemplary control device that may be used in the disclosed lever driven bicycle.

FIG. 5 further depicts drive ratio control mechanism 70. Drive gear 75 may be rotatably positioned on an idler pivot shaft 78 near a front portion of support housing 77. Drive gear 76 may be rotatably positioned on a drive pivot shaft 80 near a rear portion of support housing 77. Drive gear 76 may be meshed with drive gear 75 such that rotation of drive gear 75 causes rotation of drive gear 76. Through this exemplary configuration, rotation of rear wheel assembly 7 may cause rotation of drive pivot shaft 80 (e.g., rotation of rear wheel assembly 7 may cause rotation of drive gear 75 through contact at surface 74, which may cause rotation of drive gear 76 through the mesh connection, which may cause rotation of drive pivot shaft 80). Drive ratio control mechanism 70 may further include a housing cover 81 configured to cover and protect an upper portion thereof.

A pair of helical drive gears 82 may be installed onto ends of drive pivot shaft 80 and positioned to mesh with corresponding helical driven gears 84. Helical driven gears 84 may each be connected to a driven gear shaft 86. Driven gear shafts 86 may be oriented perpendicular to an axis of the drive pivot shaft 80 and configured project downwardly out of support housing 77 towards rear wheel assembly 7. One end of a flexible shaft assembly 88 may be attached to each of the driven gear shafts 86. The other end of each flexible shaft assembly 88 may be attached to a corresponding end of lead screw 60 of each drive lever 10, 11. Flexible shaft assembly 88 may connect driven gear shaft 86 to lead screw 60 such that rotation of driven gear shaft 86 causes rotation of lead screw 60. Thus, because drive pivot shaft 80 is configured to cause rotation of driven gear shafts 86, drive pivot shaft 80 may control rotation of lead screws 60.

In some embodiments, drive pivot shaft 80 may include an extension 90 that, for example, projects out of support housing 77. A slip clutch 92 may be mounted at one end to extension 90. The other end of slip clutch 92 may be mounted to a motor 94 (e.g., DC drive motor) which may be attached to a mounting flange 96 of support housing 77. Slip clutch 92 may be configured to control rotation of drive pivot shaft 80 (e.g., take drive pivot shaft 80 out of rotating connection with another component, such as one or more of drive gear 75, drive gears 82, or motor 94. Motor 94 may be configured to selectively rotate drive pivot shaft 80.

Through the above described components and configuration, drive ratio control mechanism 70 may adjust a drive ratio of each drive lever 10, 11. For example, drive ratio control mechanism 70 may cause rotation of drive pivot shaft 80 (e.g., via rear wheel assembly 7 through drive gears 75, 76 or via motor 94), which may synchronously adjust the drive ratios of drive levers 10, 11. In particular, rotation of drive pivot shaft 80 may cause synchronous rotation of driven gear shafts 86, which may individually cause each slider block 55 to axially traverse a corresponding lead screw 60 (e.g., by rotating lead screws 60), and thus cause force converter 25 to axially slide on tubular body 47. This movement of force converter 25 changes the associated drive ratio, thus changing the amount of effort required by a rider to propel bicycle 2 and/or changing a power output per pedaling operation. Further, since drive ratio control mechanism 70 is configured to simultaneously rotate both driven gear shafts 86 an equal amount (e.g., via drive pivot shaft 80), the drive ratios of drive levers 10, 11 may be simultaneously adjusted by an equal amount.

In some embodiments, there may be at least two modes of operation of control mechanism 12. For example, control mechanism 12 may be configured to operate in a manual shift mode or an electronic automatic shifting mode. In the manual shifting mode, a cable assembly 108 may be mounted to frame assembly 7 and be configured to be hand operated by a rider to bring one of the drive gears 75 or 76 of drive ratio control mechanism 70 into contact with the rotating rear wheel assembly 7 resulting from the operation of drive levers 10 and 11.

In order to cause force converter 25 to traverse along tubular body 47 in a first direction, a rider may operate cable assembly 108 to bring drive gear 75 into contact with the tire of rear wheel assembly 7. This may cause drive gear 75 to rotate in an opposite direction to the rear wheel assembly 7 rotation, which may impart rotation to the meshed other drive gear 76 and ultimately rotates drive pivot shaft 80 which rotates both of the drive gears 82 and the associated driven gears 84 thereby turning the driven gear shafts 86 and the associated flexible shaft assemblies 88. This action synchronously rotates both attached lead screws 60 thereby moving both slider blocks 55 in the first direction and thus changing the drive ratio.

In order to cause force converter 25 to traverse along tubular body 47 in a second, opposite direction, a rider may operate cable assembly 108 (e.g., by pushing or pulling in an opposite direction) to retract drive gear 76 away from the tire of rear wheel assembly 7 and/or bring drive gear 76 into contact with the tire of rear wheel assembly 7. This causes drive pivot shaft 80 to turn in the opposite direction (than when drive gear 75 is in contact with the tire of rear wheel assembly 7) and may thereby cause each slider block 55 to traverse a respective lead screw 60 in the second direction. Continual actuation of cable assembly 108 in one direction may eventually cause slider block 55 to reach a limit of its travel whereupon slip clutch 92 may slip, thereby limiting any further motion in that particular direction.

In the manual mode the need for changing the drive ratio control mechanism 70 setting may be determined by the rider much the same way that a typical bike rider determines the need to change sprocket ratios. A second mode of operation of the lever driven bicycle 2 may include an electronically controlled automatic transmission (ECAT) mode. ECAT mode may allow control mechanism 12 to monitor a pedaling force used by a rider and automatically adjust the drive ratios of drive levers 10, 11 to regulate the human power that needs to be applied to force applicators 20 in order to propel bicycle 2.

In some embodiments, ECAT mode may be initiated by operating a switch (e.g., switching to an "on" position) in order to send electrical power (e.g., from a rechargeable battery) to one or more electronic control components. These electronic control components may include at least a control unit 130, a strain sensor 132, a wheel rotation sensor 134, and motor 94. Control unit 130 may be a processing and computing device, such as an electronic controller. During operation in ECAT mode, application of force to the pedal assemblies 64 and the force applicators 20 may impose a strain to strain sensor 132, resulting in a signal (e.g., a series of voltage pulses) being sent to control unit 130. Control unit 130 may receive the signal and determine a strain value (e.g., control unit 130 may take voltage pulse samples, determine an average of the magnitudes, and compare the average to a preset pulse magnitude set on a range adjuster).

In addition, wheel rotation sensor 134 may also (e.g., simultaneously) provide a signal to control unit 130, indicating that, for example, rear wheel assembly 7 is rotating. In ECAT mode, motor 94 may only receive power if control unit 130 is receiving pulses from wheel rotation sensor 134 (e.g., indicating rear wheel assembly 7 is rotating). For example, control unit 130 may only direct power to the motor control electronics if rear wheel assembly 7 is rotating.

In one example, control unit 130 may then provide a signal to one of three circuits to be energized depending on the strain value determined based on a signal or signals received from strain sensor 132. If the strain value is within a predetermined range (e.g., a pulse magnitude range adjuster setting) then no action may be taken. If the strain value is outside of the predetermined range, then power may be sent to motor 94, which may be controlled to cause the lead screws 60 to rotate in a selected direction, thereby synchronously moving the slide blocks 55 towards or away from lever pivot axis 68.

During the adjustment, strain sensor 132 may continuously send signals to control unit 130 such that a strain value is continuously monitored and compared to predetermined range. Motor 94 may continue to move slide blocks 55 until the strain value is within the predetermined range (e.g., the strain value and a preset pulse magnitude adjuster setting match within a certain range of values). Control unit 130 may then remove power from motor 94, stopping rotation of lead screws 60. In some embodiments, control unit 130 may continue to sample, compare, and make adjustments for as long as drive levers 10, 11 are being operated, thereby maintaining a near constant force input from the rider upon the pedal assemblies 64 and the force applicators 20 regardless of the terrain being traversed.

An exemplary process for configuring bicycle 2 for ECAT mode will now be described. The process may, for example, be an exemplary method for configuring and operating bicycle 2 to automatically regulate the human power that needs to be applied to force applicators 20 of each drive lever 10, 11 (e.g., via ECAT mode) in order to propel bicycle 2.

In the exemplary process, bicycle 2 may be provided with a switch for directing power to motor control electronics. Further, a microprocessor for receiving signal sets from a strain sensor and a wheel rotation sensor may be provided and programmed to compile signals sent from the strain sensor, take the average and store this value. The microprocessor may be further programmed to register a positive signal from the wheel rotation sensor when wheel rotation is occurring where said positive signal from the wheel rotation sensor provides a go ahead to provide power to other motor control electronics.

A logic circuitry path may be provided to read the positive signal from the wheel rotation sensor and to open circuitry for ratio control signal processing. Further, an adjustable electronic controller with a visual display for presetting a signal level range of values may be provided. In an exemplary embodiment, a memory and/or processing component associated with the range of values may be operationally connected via a path within the microprocessor for comparison with the last stored average strain sensor signal value.

Also, an algorithm for comparing the average strain sensor signal value with the preset signal level range of values may be provided and/or programmed into the microprocessor. The algorithm may allow the microprocessor to make, for example, one of three decisions: if the average strain sensor value is within the preset range of values then no action is taken, if the average strain sensor value is greater than the preset range of values then power is directed to the motor of the ratio control mechanism and the ratio is adjusted to a lower setting to require less foot pressure on the power applicator of the lever arrangements, or if the average strain sensor value is below the preset range of values then power is directed to the motor of the ratio control mechanism and the ratio is adjusted to a higher setting to require higher foot pedal pressure on the power applicator of the lever arrangements. These adjustments to a higher or lower ratio may continue until the strain sensor value falls within the preset value range, at which time the power may be removed from motor 94.

In some embodiments, a limiting mechanism may be provided for limiting the power provided to motor 94 when the human force applied to the force applicator causes motor 94 to drive the force converter 25 to the extent of its travel In particular, the limiting mechanism, which may be, for example, a program, sensor, end stop, or the like, may stop lead screws 60 from rotating when force converter 25 has reached a limit (e.g., an end of tubular body 47, a real or programmed end stop, etc.).

During operation (in either mode of operation), drive levers 10, 11 may receive rider foot pedal pressure on each pedal assembly 64, which causes the rear wheel 7 to rotate as described above. The rider may push either drive lever 10, 11 downward through a full range of motion of with one drive lever (e.g., drive lever 10) moving downward and the second drive lever (e.g., drive lever 11) moving upward as controlled by push rods 13, 14 and cross link 16. If the rider has limited range of motion of a leg or both legs the bicycle 2 can be readily propelled using short strokes of the drive lever 10, 11. If the rider has only one leg, drive levers 10, 11 may still be operated by the one leg using a toe clip on a corresponding pedal assembly 64. This allows the rider to pull upward on the pedal assembly 64 as well as pushing down on it. When the rider pulls up on one drive lever 10, 11, the rider is essentially pushing down on the other drive lever 10, 11 due to the push rods 13, 14 and cross link 16, as described herein.

For a rider with equal leg strength the drive ratio of each drive lever 10, 11 may be set (e.g., during assembly) to be equal (e.g., the length "I" from slider block 55 to lever pivot axis 68 is equal). For a user that has one leg that is weaker than the other, the distance "I" associated with the drive lever 10, 11 that would be used by the weaker leg may be set shorter than the distance "I" associated with the other drive lever 10, 11, thus requiring less force to be applied to that lever's force applicator 20 and associated pedal assembly 64. This adjustment may accomplished, for example, by disconnecting flexible shaft assembly 88 from the weak leg side lead screw 60 and turning the lead screw 60 manually while rotating the rear wheel assembly 7 and then reattaching the flexible shaft assembly 88 to lead screw 60.

Figure 6:
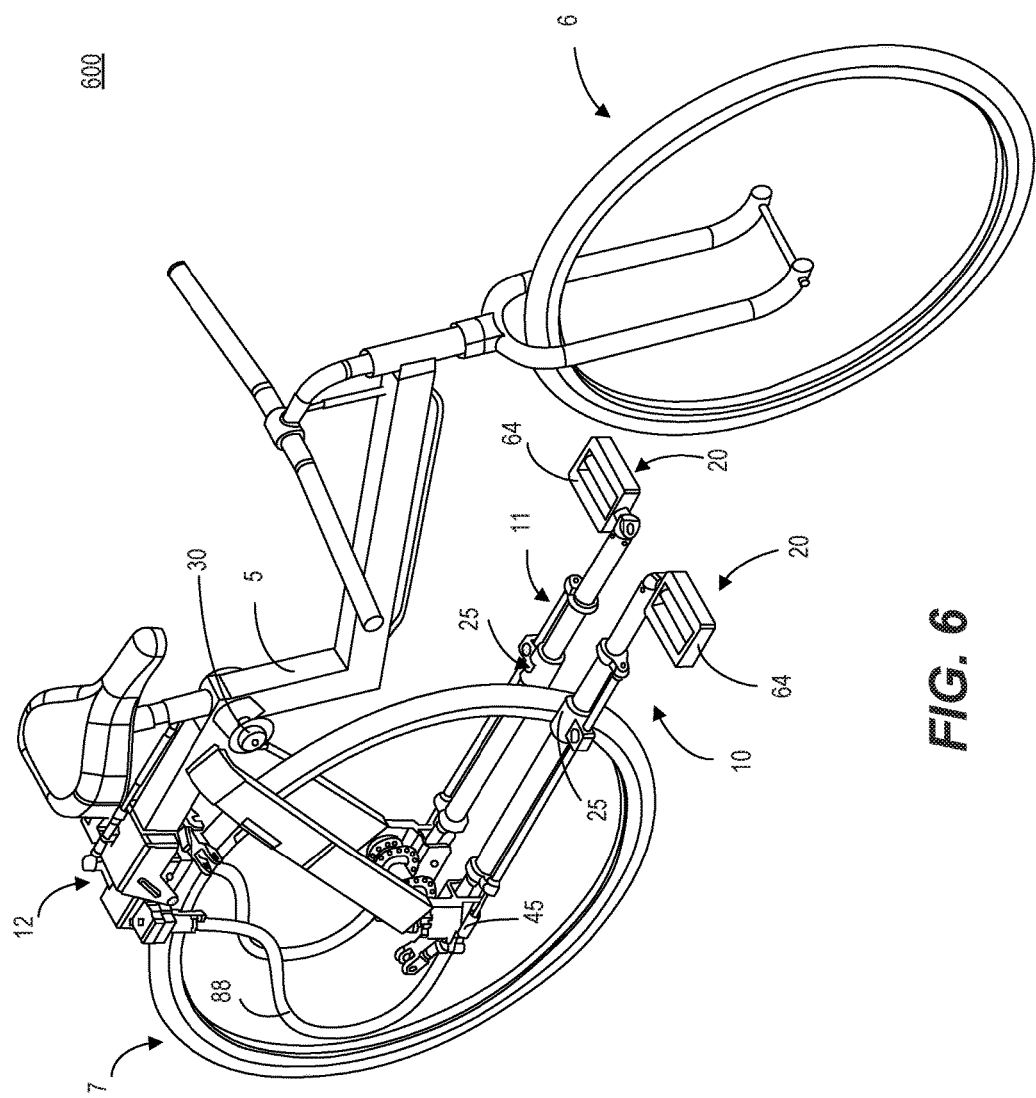
FIG. 6 shows another exemplary embodiment of a lever driven bicycle with the chain removed.

FIG. 6 shows another exemplary embodiment of a lever driven bicycle 600 with the chain 27 removed for better illustration. Bicycle 600 may be similar to bicycle 2 discussed above, except that a pulley mechanism is provided, as shown in FIGS. 7-14. Bicycle 600 includes elements that are similar to those included in bicycle 2. The descriptions of such elements are not repeated here.

Figure 7:
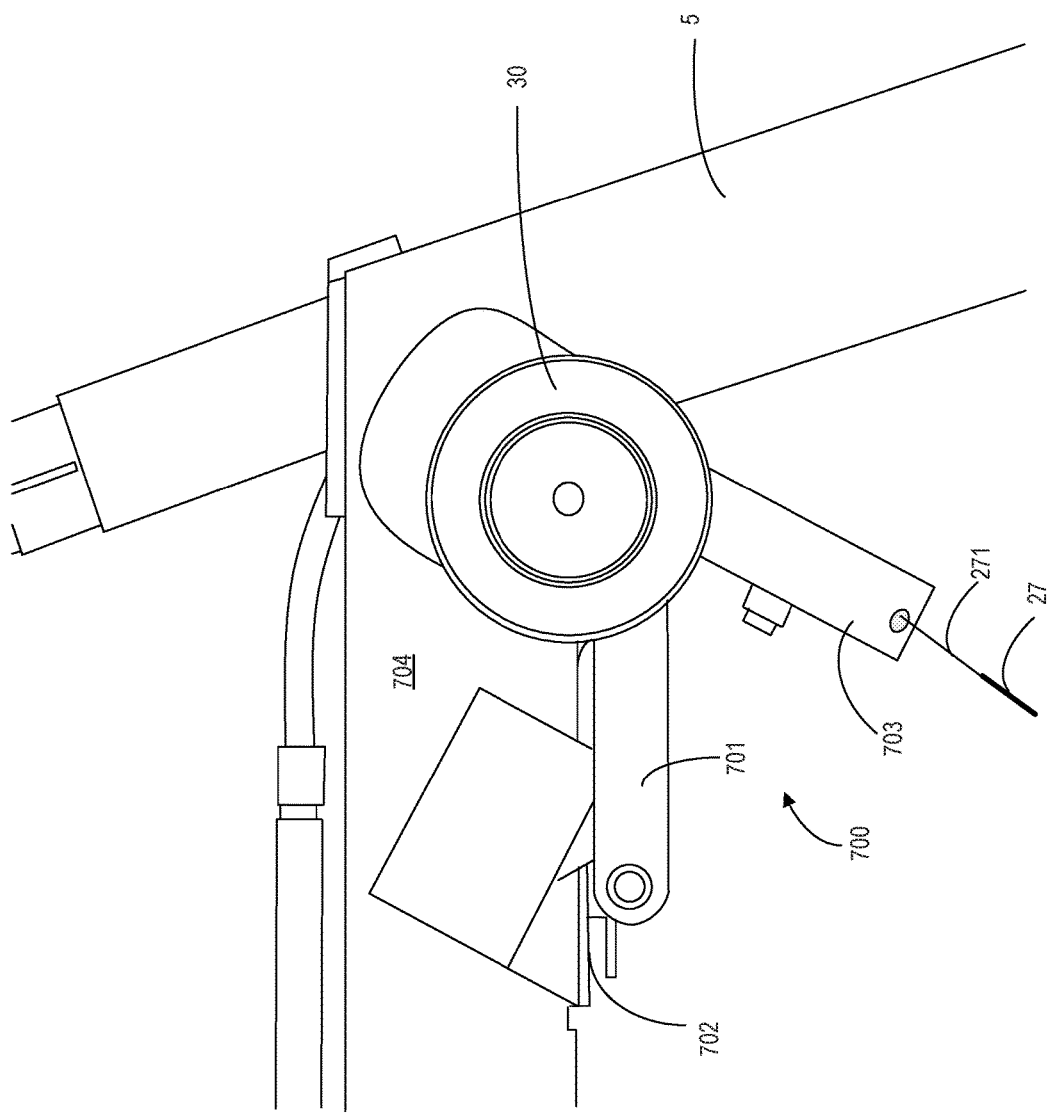
FIG. 7 shows an exemplary pulley mechanism that may be used in the disclosed lever driven bicycle.

FIG. 7 shows an exemplary pulley mechanism 700 configured to be connected to a flexible cable extension 271 of a chain 27 to allow the cable extension 271 on each side of bicycle 600 to be pulled up and down reciprocally as a user pedals bicycle 600. The cable extension 271 is connected with the chain 27 at the ends on each side of the bicycle 600. Pulley mechanism 700 includes a first plate 701, a second plate 702, a double pulley assembly 703, and a frame 704. Frame 704 connects with frame assembly 5. The cable extension 271 enters the double pulley assembly 703 at one side of the bicycle 600 and exits the double pulley assembly 703 at the other side of the bicycle 600.

Figure 8:
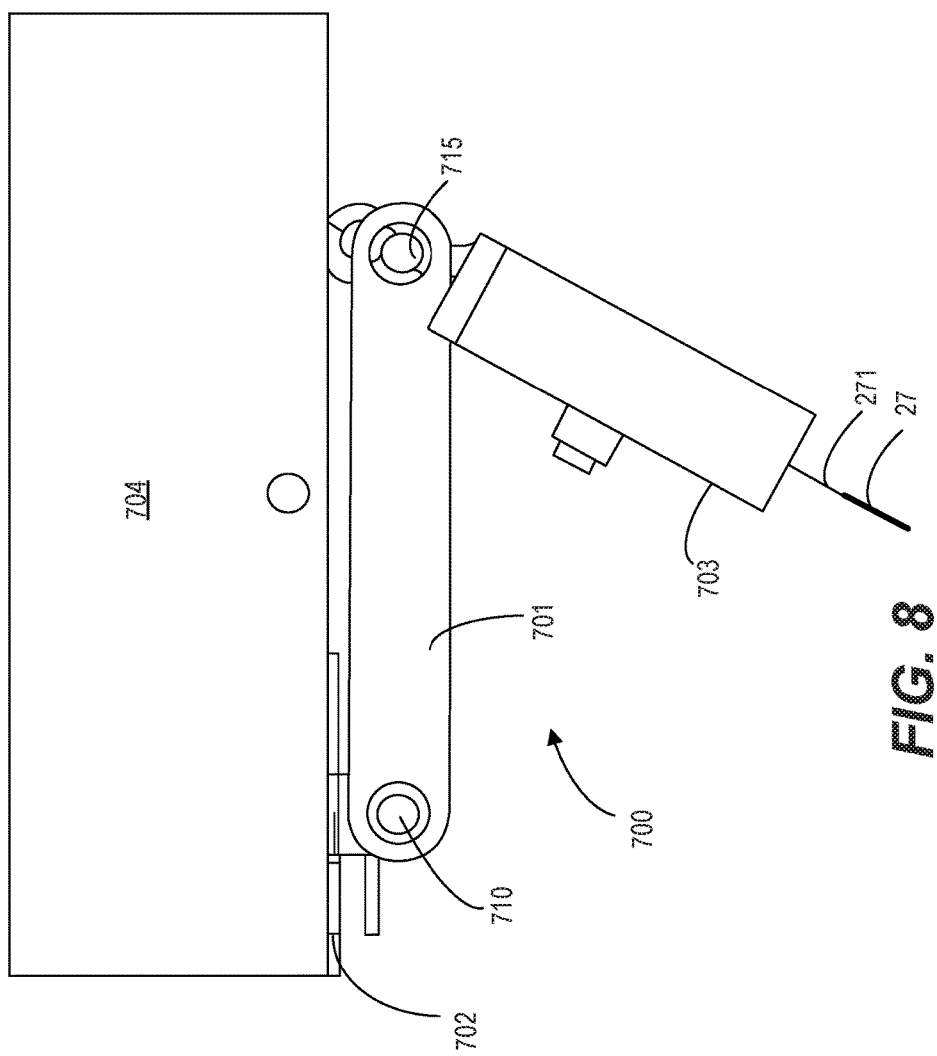
FIG. 8 shows a side view of the pulley mechanism of FIG. 7.

FIG. 8 shows a side view of pulley mechanism 700. As shown in FIG. 8, second plate 702 is securely attached to frame 704 through any suitable means, such as bolts, screws, welding, glue, etc. First plate 701 is pivotally connected to second plate 702. In the embodiment shown in FIG. 8, first plate 701 is pivotally connected to second plate 702 through a rotating shaft 710 and a torsion spring (e.g., the torsion spring shown in FIG. 10) on each side. Other pivotal connection means may also be used for connecting first plate 701 to second plate 702. Double pulley assembly 703 is pivotally connected to first plate 701 through a rotating shaft 715 and a torsional spring (e.g., the torsion spring shown in FIG. 10) on each side. Other pivotal connection means may also be used for connecting the double pulley assembly 703 to first plate 701. FIG. 8 also shows the cable extension 271 of the chain 27, which is connected with double pulley assembly 703. The cable extension 271 enters double pulley assembly 703 from an inlet at one side of the bicycle 600, and exits from double pulley assembly 703 at an outlet at the other side of the bicycle 600, which is shown in more detail in FIG. 11.

Figure 9:
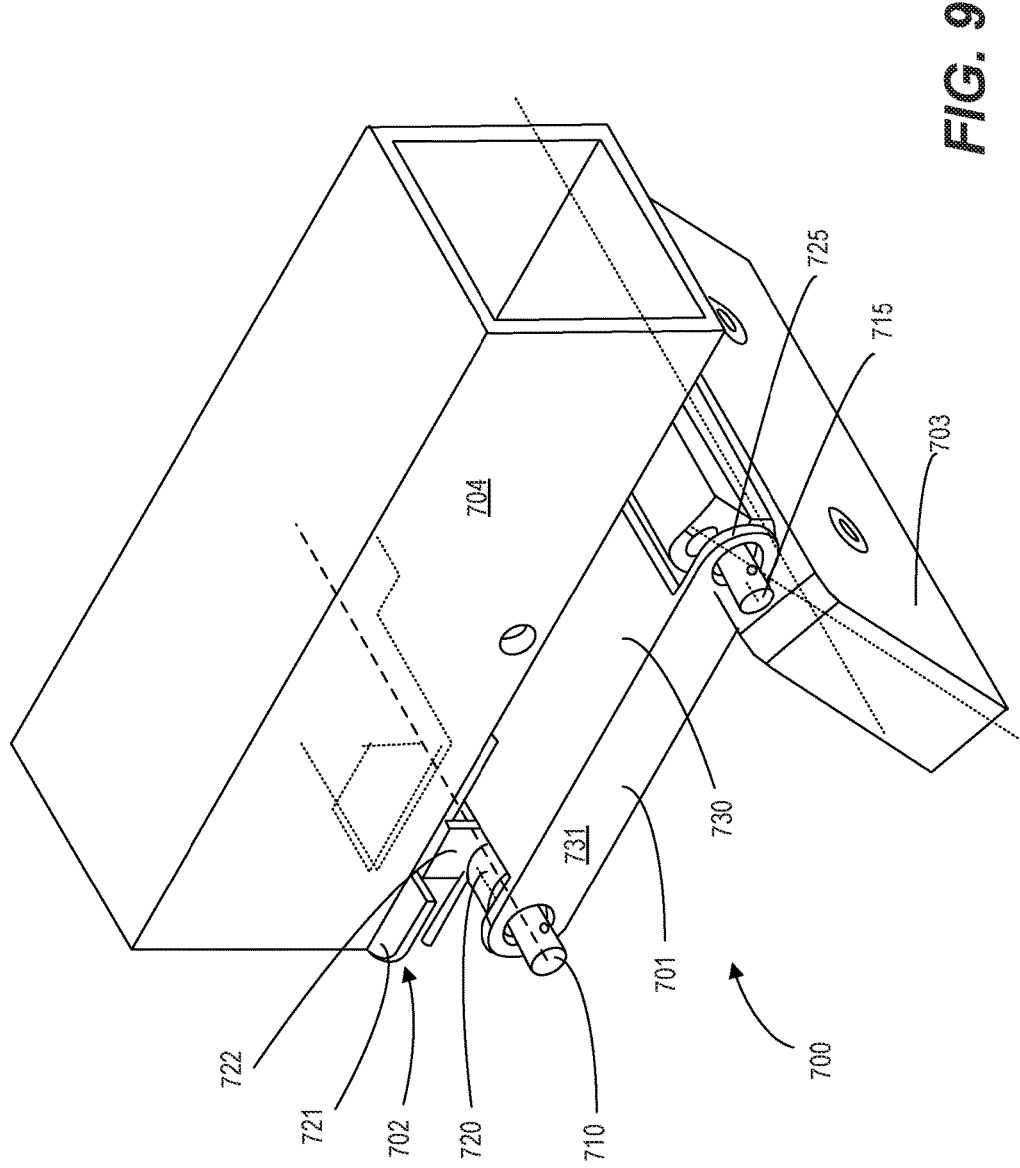
FIG. 9 is a perspective view of the pulley mechanism of FIG. 7.

FIG. 9 is a perspective view of pulley mechanism 700. FIG. 9 shows the location where the torsion springs 720 and 725 may be located. As shown in FIG. 9, first plate 701 includes a plate 730 and a vertical wall 731 (on each side of first plate 701). Vertical wall 731 includes two holes at both ends configured to receive rotating shaft 710 and rotating shaft 715. Second plate 702 includes a plate 721 and a vertical ear 722 (on each side of second plate 702). The vertical ear 722 includes a hole configured to receive rotating shaft 710. Torsion spring 720 may be located between the end portion of vertical wall 731 and vertical ear 722. Torsion spring 720 may be configured to exert a torsional force on first plate 701 to force first plate 701 toward frame 704, so as to balance the downward pulling force of double pulley assembly 703 caused by movement of chain 27 during pedaling. Torsion spring 725 may be located behind an end portion of vertical wall 731, as shown in FIG. 9. Torsion spring 725 may be configured to exert a force on double pulley assembly 703 to force double pulley assembly 703 toward first plate 701, so as to balance the downward pulling force caused by the moving chain during pedaling.

In the embodiment shown in FIG. 9, a pair of torsion springs 720 is used for pivotally connecting first plate 701 with second plate 702. Other embodiments not shown may include a single torsion spring, or more than two torsion springs. Similarly, although the embodiment shown in FIG. 9 includes a pair of torsion springs 725 for pivotally connecting double pulley assembly 703 and first plate 701, in other embodiments, a single torsion spring or more than two torsion springs may be used.

Figure 10:
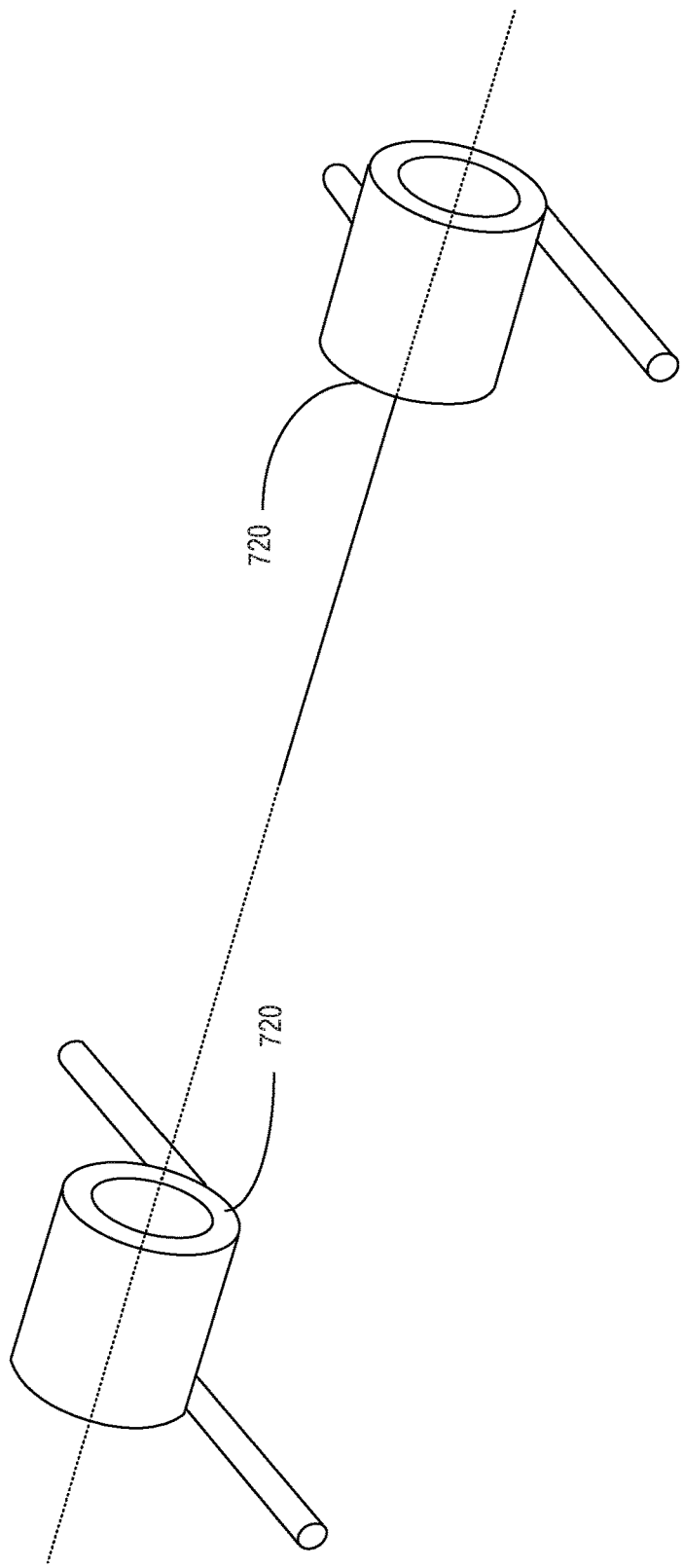
FIG. 10 shows exemplary torsion springs that may be included in the pulley mechanism of FIG. 7.

FIG. 10 shows exemplary torsion springs 720. It is noted that torsion springs 725 may be similar to torsion springs 720. Other types of torsion springs may also be used as torsion springs 720 and 725.

Figure 11:
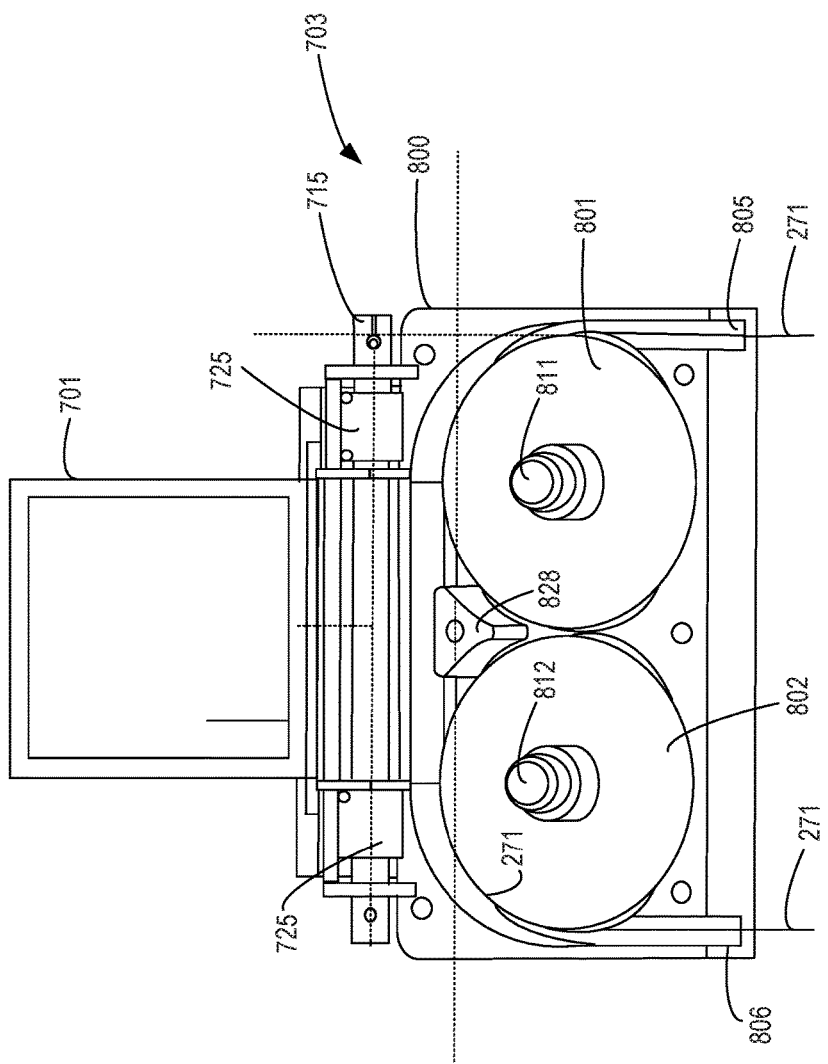
FIG. 11 shows a perspective view of the inside of double pulley assembly with a cover removed.

FIG. 11 shows a perspective view of the inside of double pulley assembly 703 with a cover plate (not shown) removed. In some embodiments, the double pulley assembly 703 may not include a cover plate. As shown in FIG. 11, double pulley assembly 703 includes a housing 800. A pair of pulleys 801 and 802 (first pulley 801 and second pulley 802) are disposed within housing 800. Housing 800 includes an inlet 805 and an outlet 806 for cable extension 271 to enter housing 800 and exit housing 800. Cable extension 271 tightly wraps around a portion of the peripheral surfaces of pulleys 801 and 802. Pulleys 801 and 802 are rotatable around their respective shafts 811 and 812. When one end of chain 27 is being pulled, pulleys 801 and 802 rotate to allow smooth movement of cable extension 271. Double pulley assembly 703 includes a fixture 828 disposed between the pulleys 801 and 802, and configured to contact extension cable 271 in order to clean cable extension 271 when cable chain extension 271 moves around pulleys 801 and 802.

FIG. 11 also shows that double pulley assembly 703 is pivotally connected with first plate 701 through shaft 715 and a pair of torsion springs 725. Other embodiments may use a single pulley. In addition, other embodiments may use a single torsion spring or more than two torsion springs. Each pulley 801, 802 may include a radius around 1.09 inches (around 2.77 centimeters). The diameter of inlet 805 and outlet 806 may be around 0.185 inch (around 0.47 centimeter). In other embodiments, the radius of pulleys 801 and 802 and the diameter of the inlet 805 and outlet 806 may include other suitable sizes.

When a user pedals bicycle 600, chain 27 is pulled up and down along with the up and down movement of force applicators 20. Pulleys 801 and 802 rotate to allow chain 27 to be pulled more to one side of bicycle 600, or pulled more to the other side of bicycle 600.

Figure 12:
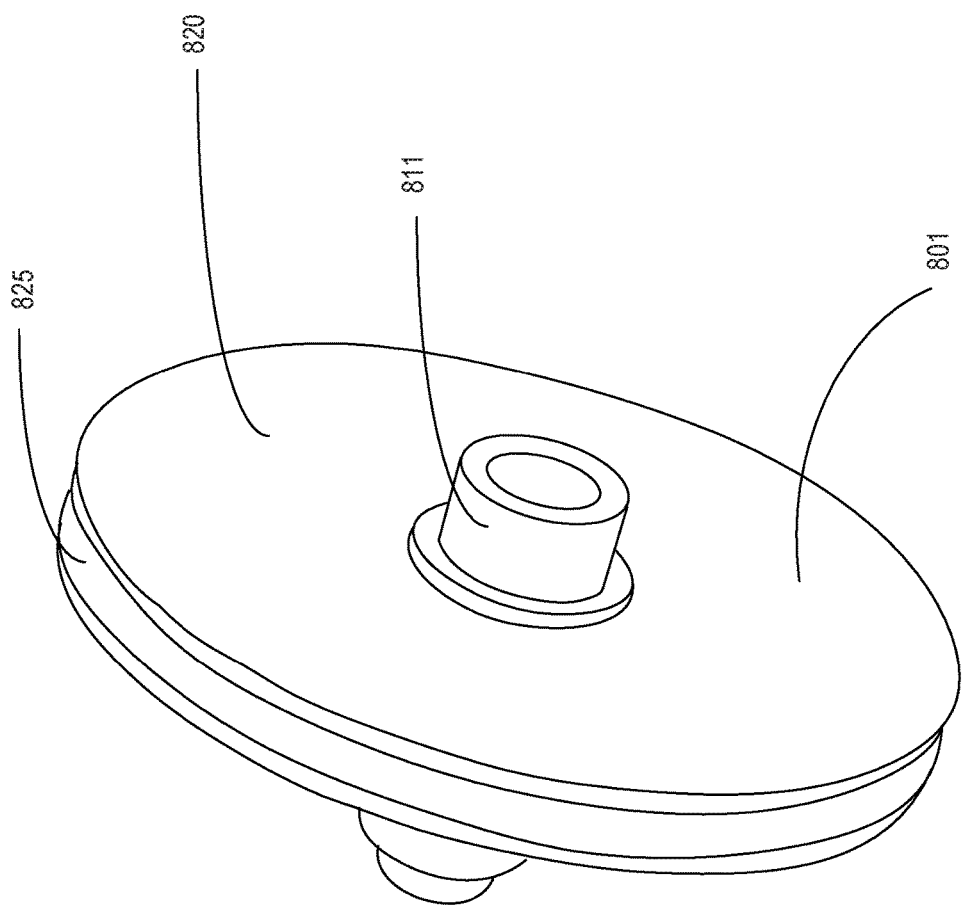
FIG. 12 shows an exemplary pulley that may be included in the double pulley assembly.

FIG. 12 shows an exemplary pulley 801. Pulley 801 includes shaft 811 and a plate 820 configured to rotate around shaft 811. Plate 820 includes a groove 825 formed on the peripheral surface of plate 820 for receiving chain 27. Pulley 802 may be similar to pulley 801. Any other pulley known in the art may be used for pulleys 801 and 802.

Figure 13:
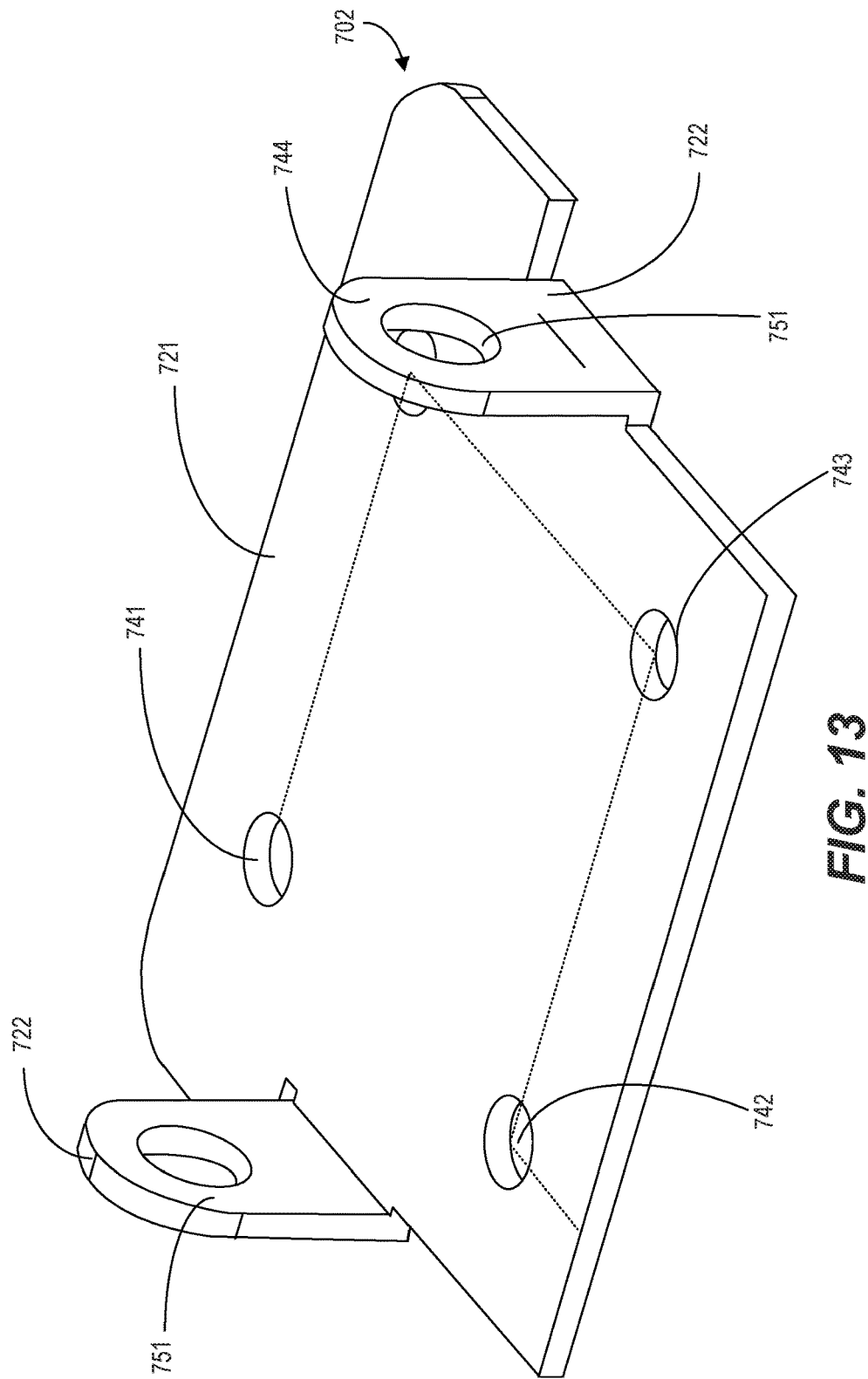
FIG. 13 shows an exemplary second plate that may be included in the pulley mechanism of FIG. 7.

FIG. 13 shows an exemplary second plate 702. Second plate 702 includes horizontal plate 721 and vertical ears 722. Horizontal plate 721 includes at least one (e.g., four) hole 741 configured to receive a bolt or screw for attaching second plate 702 to frame 704. Each vertical ear 722 includes a hole 751 configured to receive rotating shaft 710 for pivotally connecting first plate 701 to second plate 702.

Figure 14:
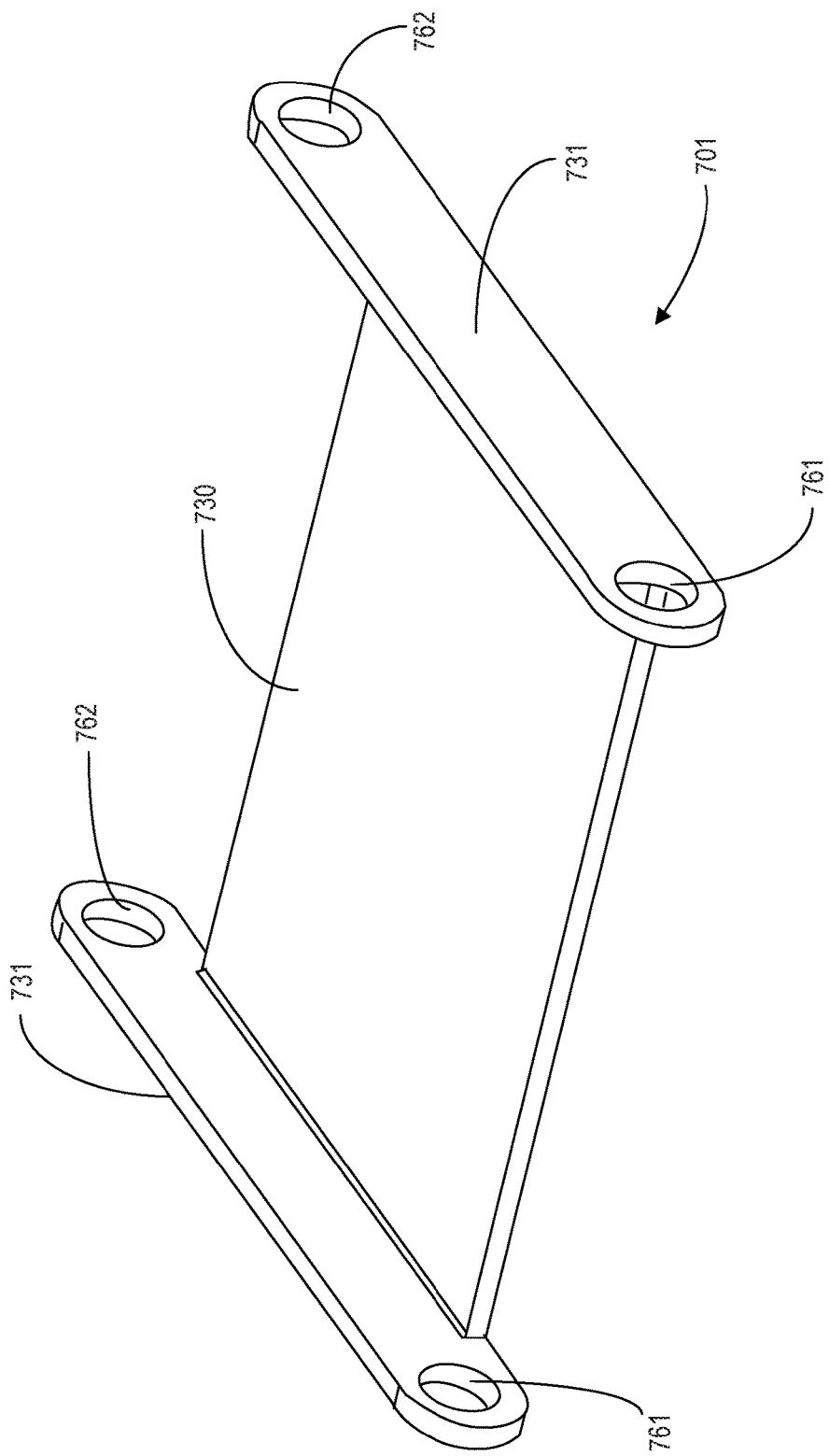
FIG. 14 shows an exemplary first plate that may be included in the pulley mechanism of FIG. 7.

FIG. 14 shows an exemplary first plate 701. First plate 701 includes horizontal plate 730 and two vertical walls 731. Each vertical wall 731 includes two holes at both ends for receiving rotating shaft 710 and rotating shaft 715, respectively.

Figure 15:
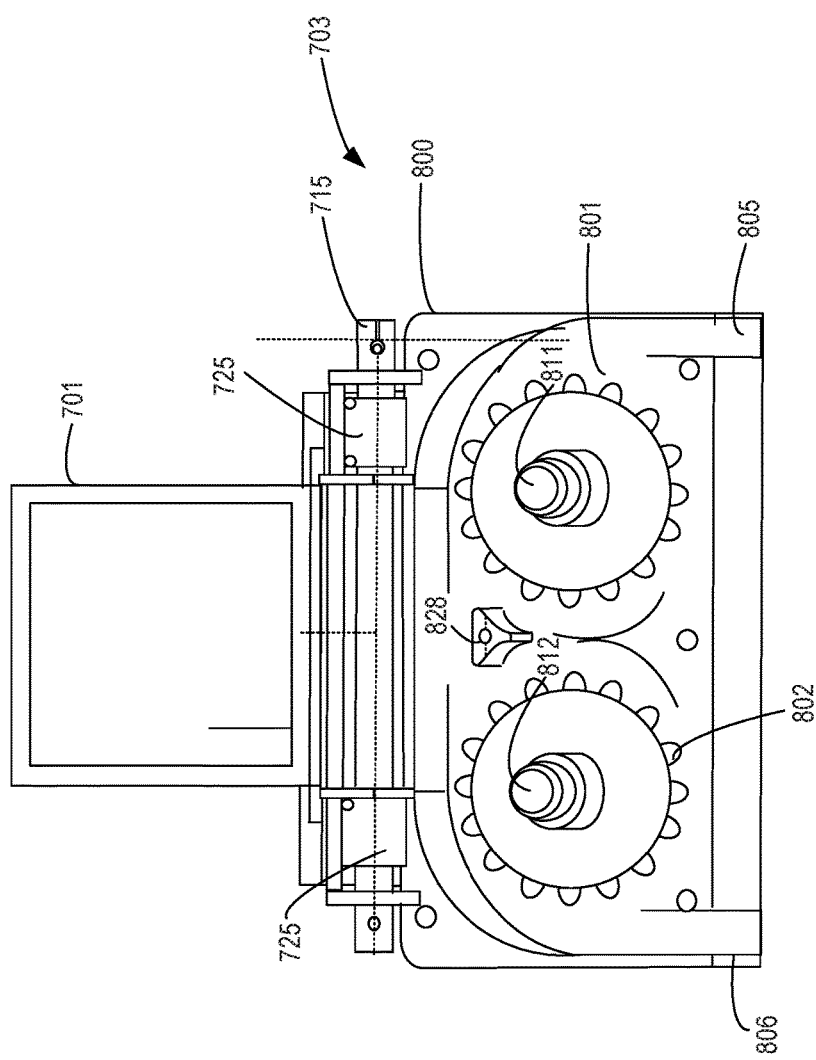
FIG. 15 shows a perspective view of the inside of a double pulley assembly with a cover plate removed, in which the pair of pulleys shown in FIG. 11 are in the form of sprockets.

FIG. 15 shows a perspective view of the inside of double pulley assembly 703 with a cover plate (not shown) removed, in which the pair of pulleys 801 and 802 shown in FIG. 11 are in the form of sprockets (so in this embodiment, pulleys 801 and 802 are also referred to as sprockets 801 and 802). In this embodiment, instead of using a cable extension 271, as shown in FIG. 11, the chain 27 enters (e.g., via inlet 805) into the double pulley assembly 703, wraps around the pair of sprockets 801 and 802 (e.g., wraps around the top and right portion of sprocket 801, goes around fixture 828, and wraps around the top and left portion of sprocket 802), and exits the assembly 703 (e.g., via exit 806).

FIG. 16 shows a side view illustration of a portion of a lever driven bicycle according to another embodiment. The embodiment shown in FIG. 16 is different from the embodiment shown in FIG. 2 in that chain 27 proceeds up from chain attachment location 29, wraps counter-clockwise around sprocket 30, and proceeds down (with a portion shown in a dotted line) and wraps counter-clockwise around sprocket 32, and then proceeds upward to spring 35. The spring 35 is attached to frame 5 at a location underneath sprocket 30 in line with a pivot axis of sprocket 30. For example, the spring 35 may be attached to the axis around which the sprocket 30 rotates.

The disclosed embodiments provide a lever driven bicycle that allows for synchronous adjustment of a drive ratio associated with each drive lever of the bicycle. In addition, various aspects of the disclosed lever driven bicycle also allow the drive ratios to be adjusted quickly and easily, and manually or automatically. One of the further aspects of the disclosed lever driven bicycle is the configuration of the force converter and slide block, which is arranged to traverse a lead screw even though the drive levers pivot, causing the lead screw to form an inclined plane, having varying angles of inclination.

Further, in previous lever driven bicycles, drive ratio adjustment may be attempted to be made without rotating the rear wheel, due to the individual adjustments that were necessary. However, this can produce extreme strain levels in the chain drive components and may possibly cause the frame assembly to crack. Embodiments of the present disclosure ensure that the rear wheel is rotating before attempting to adjust the drive ratio, either through a mechanism that is rotated by the rear wheel itself, or through an electronic mechanism that monitors a state of the rear wheel.

It will be apparent to those skilled in the art that various modifications and variations can be made to the lever driven bicycle of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:
1. A lever driven bicycle comprising:
a pair of drive levers pivotable around an axis;
a force applicator connected to each drive lever and configured to receive an application of a force to rotate a drive wheel;
a force converter connected to each drive lever;
an adjustment mechanism linked to each drive lever configured to adjust a location of the force converter with respect to a corresponding drive lever; and
a control mechanism configured to adjust the drive ratio of the drive levers, the control mechanism comprising two synchronously rotatable output shafts, wherein each synchronously rotatable output shaft is linked to a respective adjustment mechanism and rotation of the synchronously rotatable output shaft causes the adjustment mechanism to adjust the location of a respective force converter.

2. The lever drive bicycle of claim 1, wherein the pair of drive levers are connected to a cross link pivotably connected to a bracket, wherein the cross link is configured to cause one of the drive levers to counter rotate with respect to the other lever, and wherein the bracket includes at least a bumper configured to limit the angular travel of the pair of levers.

3. The lever driven bicycle of claim 1, wherein the adjustment mechanism includes a lead screw and a slider block threaded on the lead screw, wherein the slider block is connected to the respective force converter.

4. The lever driven bicycle of claim 3, wherein the adjustment mechanism further includes a flexible shaft assembly connecting one of the rotatable output shafts to a respective lead screw.

5. The lever driven bicycle of claim 3, wherein the drive ratio control mechanism comprises a pair of intermeshed drive gears positioned in close proximity to a surface of a tire of the drive wheel such that a periphery of one of the drive gears can be brought into contact with the surface of the tire to cause the one of the drive gears to rotate.

6. The lever driven bicycle of claim 5, wherein at least one of the drive gears is configured to rotate a drive pivot shaft, and wherein rotation of the drive pivot shaft causes the two output shafts to synchronously rotate.

7. The lever drive bicycle of claim 6, wherein the drive ratio control mechanism is configured such that a first drive gear of the pair of drive gears can be brought into contact with surface of the tire to cause the drive pivot shaft to rotate in a first direction and a second drive gear of the pair of drive gears can be brought into contact with the surface of the tire to cause the drive pivot shaft to rotate in a second direction different from the first direction.

8. The lever driven bicycle of claim 1, further comprising:
   a drive pivot shaft, wherein rotation of the drive pivot shaft causes the two output shafts to synchronously rotate; and
   a motor configured to rotate the drive pivot shaft.

9. The lever driven bicycle of claim 8, further comprising a control unit and at least one sensor configured to generate a signal, wherein the control unit is configured to control the motor to control rotation of the drive pivot shaft based on the signal.

10. The lever driven bicycle of claim 9, wherein the at least one sensor includes a strain sensor and the control unit is configured to determine a strain value based on the signal, and wherein the control unit is configured to compare the strain value to a predetermined range, and cause the motor to rotate the drive pivot shaft in a selected direction based on the comparison.

11. The lever driven bicycle of claim 9, wherein the at least one sensor further includes a wheel rotation sensor, and wherein the control unit is configured to determine that the drive wheel is rotating based on the signal, and direct power to the motor based on the determination.

12. The lever driven bicycle of claim 1, further comprising a double pulley assembly including a pair of pulleys configured to rotate and allow a flexible cable extension that wraps around the pulleys to move, wherein the flexible cable extension is connected to a chain that is connected to the force converter, and the chain moves up and down along with movement of the force converter, and
   wherein the double pulley assembly is pivotally connected to a first plate that is pivotally connected to a second plate, the second plate being attached to a frame of the bicycle.

* * * * *